(12) United States Patent
Svedberg (10) Patent No.: US 6,341,128 B1
(45) Date of Patent: Jan. 22, 2002

(54) PROVIDING CALL CENTERS WITH VOICE GATEWAYS

(75) Inventor: Johan Svedberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/188,390

(22) Filed: Nov. 10, 1998

(30) Foreign Application Priority Data

Nov. 11, 1997 (SE) .............................................. 9704128

(51) Int. Cl.⁷ .............................................. H04L 12/66
(52) U.S. Cl. ........................................ 370/352; 370/401
(58) Field of Search ................................. 370/352, 353, 370/389, 392, 396, 401, 404, 402, 403, 405, 354, 355, 356, 410; 379/88.17; 709/203, 225, 229

(56) References Cited

U.S. PATENT DOCUMENTS

| | | | |
|---|---|---|---|
| 5,905,736 A | * 5/1999 | Ronen et al. | 370/546 |
| 5,907,598 A | * 5/1999 | Mandalia et al. | 379/100.01 |
| 5,918,019 A | * 6/1999 | Valencia | 709/227 |
| 5,949,875 A | * 9/1999 | Walker et al. | 380/4 |
| 5,970,477 A | * 10/1999 | Roden | 705/32 |
| 5,987,102 A | * 11/1999 | Elliott et al. | 379/93.17 |
| 5,999,965 A | * 12/1999 | Kelly | 709/202 |
| 6,009,469 A | * 12/1999 | Mattaway et al. | 709/227 |
| 6,031,836 A | * 2/2000 | Haserodt | 370/389 |
| 6,069,890 A | * 5/2000 | White et al. | 370/352 |
| 6,137,869 A | * 10/2000 | Voit et al. | 379/114 |
| 6,157,636 A | * 12/2000 | Voit et al. | 370/353 |
| 6,181,690 B1 | * 1/2001 | Civanlar | 370/352 |

* cited by examiner

Primary Examiner—Alpus H. Hsu
Assistant Examiner—Brian Nguyen
(74) Attorney, Agent, or Firm—Burns, Doane, Swecker & Mathis, L.L.P.

(57) ABSTRACT

The present invention relates to an apparatus and a method for verifying that a client is allowed to use a voice gateway, which is provided by a provider of voice gateway services. According to the invention, the client activates a link, comprising a telephone number to a B-subscriber, on a web-page on a web-server, a verification function verifying that the client is allowed to use the voice gateway, and a telephone call is set up over the voice gateway depending on said verification.

11 Claims, 7 Drawing Sheets

PROVIDING CALL CENTERS WITH VOICE GATEWAYS

This application claims priority under 35 U.S.C. §§119 and/or 365 to 9704128-9 filed in Sweden on Nov. 11, 1997; the entire content of which is hereby incorporated by reference.

BACKGROUND OF THE INVENTION

1. Technical Field

The present invention relates to telecommunication and the Internet in general, and to verification for using voice gateways in particular.

2. Description of Related Art

For a company to be able to in an efficient way sell or give support on its products an effective interface to the market is required. This can for example be achieved by offering customers to call the company to order or ask questions relating to the products the company offers. By different types of functions, in Sweden 020-numbers, in the USA 800-numbers, also these can be free of charge. These calls are received in a call centre, in which a number of persons, competent to respond to questions related to the products, or to receive new orders answers the calls. These call centres do not have to be localised near the company, but can with the aid of for instance IN (Intelligent Networks) be localised in another completely different geographical place.

Telephony over the Internet is a new, growing market where a new type of companies appear. These companies offer for instance a service to be able to call from the Internet to an ordinary subscriber in the traditional telephone network. This is achieved by means of a voice gateway, which is connected to the traditional telephone network, such as PSTN or ISDN and to a packet switched network, for instance the Internet. The voice gateway transforms speech from the telephone network to packets adapted to the packet switched network, which are further transferred to a program in the user's computer and are transformed to speech. Packets which are sent from the program and contains speech from the user are transformed in the voice gateway to a format adapted to the telephone network.

An Internet provider is in the following referred to as a company or person producing web-pages on the Internet. An Internet provider can also be a person or a company providing the connection to Internet over a telephone or a company or a person offering a third party to publish web-pages on the Internet. However, by the present invention it is important that the Internet provider also in one way or another publishes web-pages which may contain advertisements.

There is an increasing extent of interest in advertising on web-pages on the Internet for an ever increasing number of companies. These advertisements often consist of a so-called "banner" with graphics, sometimes movable, and if one clicks on it, you will end up on the home-page of the advertiser. These advertisements can also be located on web-pages anywhere on the Internet. For companies which also provide a call centre, it can be interesting for the user, when he clicks on the advertisement, to be linked to the call centre instead of the home-page of the company, where he can obtain personal assistance with his product or order new products. The call can then be linked between a program on the user's computer, over a voice gateway and further to the call centre.

If the operation of the voice gateway is done by the same company that handles the call centre, there will be no problems with verification of the user and the charging of the call costs for the call between the voice gateway and the call centre. Also, no problem will arise if the user pays for the call or if the call is free of charge in another way. But if the operator of the call centre wants to offer free telephone support to a user, but does not want to invest in a voice gateway of his own and the Internet provider does not either want to invest in a voice gateway, a third party could have as business idea to offer a telephone link between a user connected to the Internet and a B-subscriber. An Internet provider would then be able to offer free advertising on a web-page, where a click on the advertisement meant a call to the call centre. The operator of the call centre would pay the Internet provider for the advertisement and the provider of the voice gateway service would charge the Internet-provider. Problem then arises how the supplier of the voice gateway service in a secure way could be able to verify that a user is allowed to use the voice gateway and charge an Internet provider for only the calls originating from an advertisement on the web-server of the Internet provider.

A business link is obtained between a provider on a web-page which is interested in having customers to be able to contact the advertiser over the web-advertisement by phone, a provider of voice gateway-services and a provider of Internet services. To be able to charge between the provider of the gateway service and the Internet provider a verification is required and an interface between these parts. The Internet provider can also charge the advertiser for the extended value it requires to have direct telephone access to a customer.

DISCLOSURE OF THE INVENTION

The present invention is directed to above mentioned problem how a provider of voice gateway services for telephony over the Internet can be able to verify that a user is allowed to use voice gateway services.

Another problem that an embodiment of the invention solves is that a provider of voice gateway services can charge a provider of Internet services.

Another problem that an embodiment of the present invention solves is how to provide a provider of Internet services with a function providing a user to click on an Internet advertisement and hence set up a telephone call to a subscriber, for instance a call centre.

Thus, an object of the present invention is to provide a provider of Internet services and a provider of voice gateway services with a function for verification of a user to be allowed to use a voice gateway service.

Another object of an embodiment of the present invention is that a provider of voice gateway services for telephony over the Internet can supply and charge a provider of Internet services for using voice gateway services and how the verification and charging can be made safe.

Above described problems, how a verification of a user, which will use voice gateway services can be obtained, is solved by means of a verification function, which verifies a terminal of the provider of the voice gateway function.

In more detail, said problem described above is solved by a user activating an advertisement on a web-page, whereby said advertisement points to a specific B-subscriber in a telephony network, such as a PSTN or ISDN. Information about which voice gateway is to be used, the IP address for the program of the user, the IP-address of the web-server on which the web-page with the activated link is localised to, and further information are transferred between the web-server, the voice gateway, and the program of the user, so that it is ascertained that the user has obtained telephone numbers to the B-subscriber and the address to the voices gateway from the web server, whereafter the voice gateway sets up a call between the B-subscriber and the program of the user. The voice gateway registers the length of the call, from which web-server it originated, and the IP-address of the program of the user, and further information to be able to charge the operator of the web-server for the call. Thereby it is ascertained that the call occurring between the user and the advertiser originated in the advertisement of the operator of the web-server, which is also charged for the cost in a conventional way.

An advantage of the present invention is that a provider of voice gateway services can be able to verify that a user is allowed to use the voice gateway.

An advantage of the present invention is that a provider of voice gateway services can sell the functionality to an Internet provider.

Another advantage is that only Internet providers with a relation to the provider of voice gateway services can employ the services.

Yet another advantage is that one provider of voice gateway services can charge an Internet provider for using the voice gateway based on user.

The invention will now be described in more detail by way of preferred embodiments and with reference to accompanying drawings.

DETAILED DESCRIPTION OF PREFERRED EMBODIMENTS

Figure 1:
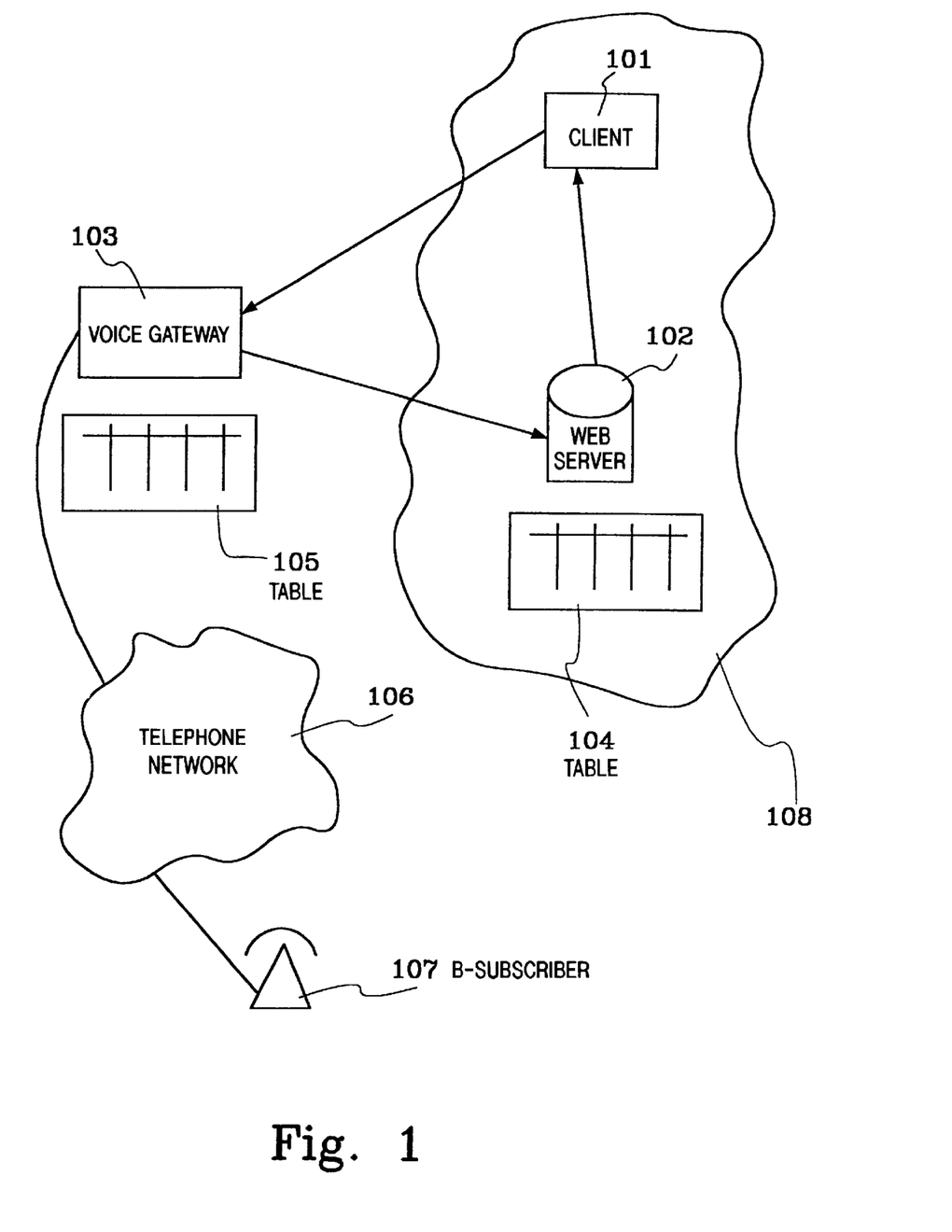
FIG. 1 illustrates a net model according to one embodiment of the invention.

In FIG. 1 a client is designated 101. The client 101 is a software installed in a computer of a user. The client 101 can comprise a net-browser, such as Netscape Communicator, Mosaic or Microsoft Internet Explorer. By means of the net-browser a user chooses to activate a link on a web-page on a web-server 102. This activation can be performed by means of the user clicking on a graphical advertisement. The web-server 102 then transmits data to the client 101. If for instance Netscape's Communicator is used as net-browser, a so-called plug-in, an "applet" or a help application can receive the data which is transmitted by the web-server. This plug-in, "applet" or help application can then also act as a terminal supported by the audio card in the computer, loudspeakers and a microphone. The terminal can for instance support the protocol H.323 standardised by ITU, but is of course not limited thereto, but also other types of protocols for Internet telephony are possible.

A "plug-in" is a program which provides a function and which is seam-lessly integrated to another program. Examples are a player of digitised film, e.g. MPEG, which is integrated with a net-browser, e.g. Netscape Navigator. In this way the user can watch the digitised movie in a net-browser. An "applet" is a function which is loaded simultaneously with other data. An "applet" also gives increased functionality for program, such as a net-browser.

The data that is transferred from the web-server 102 to the client 101 comprises the IP-address of the web-server, the IP-address of a voice gateway, a non-repetitive value and a telephone number. The web-server 102 simultaneously stores the IP-address of the client 101, selected voice gateway, the non-repetitive value and a time stamp in a table 104. The time stamp illustrates when the contact between the client 101 and the web-server occurred.

The client 101 then contacts a voice gateway 103 given by the transferred IP-address. The voice gateway can support for instance H.323 and corresponds to in that standard, a gateway or a gatekeeper. Of course also a second protocol can be present. The client 101 transfers the following items to the voice gateway 103: the IP-address for the web-server, the IP-address for the client 101, the telephone number and the non-repetitive value transferred at an earlier point of time from the web-server 102 to the client 101.

The voice gateway 103 determines whether the transferred IP-address of the web-server is stored as an accepted web-server in a table 105. If that is the case, the web-server is contacted.

Subsequently, in the present embodiment, the voice gateway 103 sends the client's IP-address 101, the IP-address of the voice gateway 103 and the non-repetitive value to the web-server which performs a comparison of transferred data to stored data in the table 104. The voice gateway 103 determines whether the transferred IP-address corresponds to any IP-address stored in the table 104. If the IP-address is stored in the table 104 and the non-repetitive value which was sent from the client corresponds to the value which is stored in the table 104 and which is associated to the stored IP-address and if not too long time has passed according to the time stamp stored in the table 104, a message is sent to the voice gateway 103 to indicate this.

Then, the voice gateway sets up a connection between the B-subscriber 107 over the telephone network 106 over the voice gateway 103 to the client 101 over the IP-network 108. The voice gateway translates speech from the B-subscriber 107 received over the telephone network 106, packetises it and sends it further to the client 101 over the IP-network 108. In the same way the voice gateway 103 unpacketises packets received from the client 101 over the IP-network 108 and sends the speech to the B-subscriber 107 over the telephone network 106.

Figure 2:
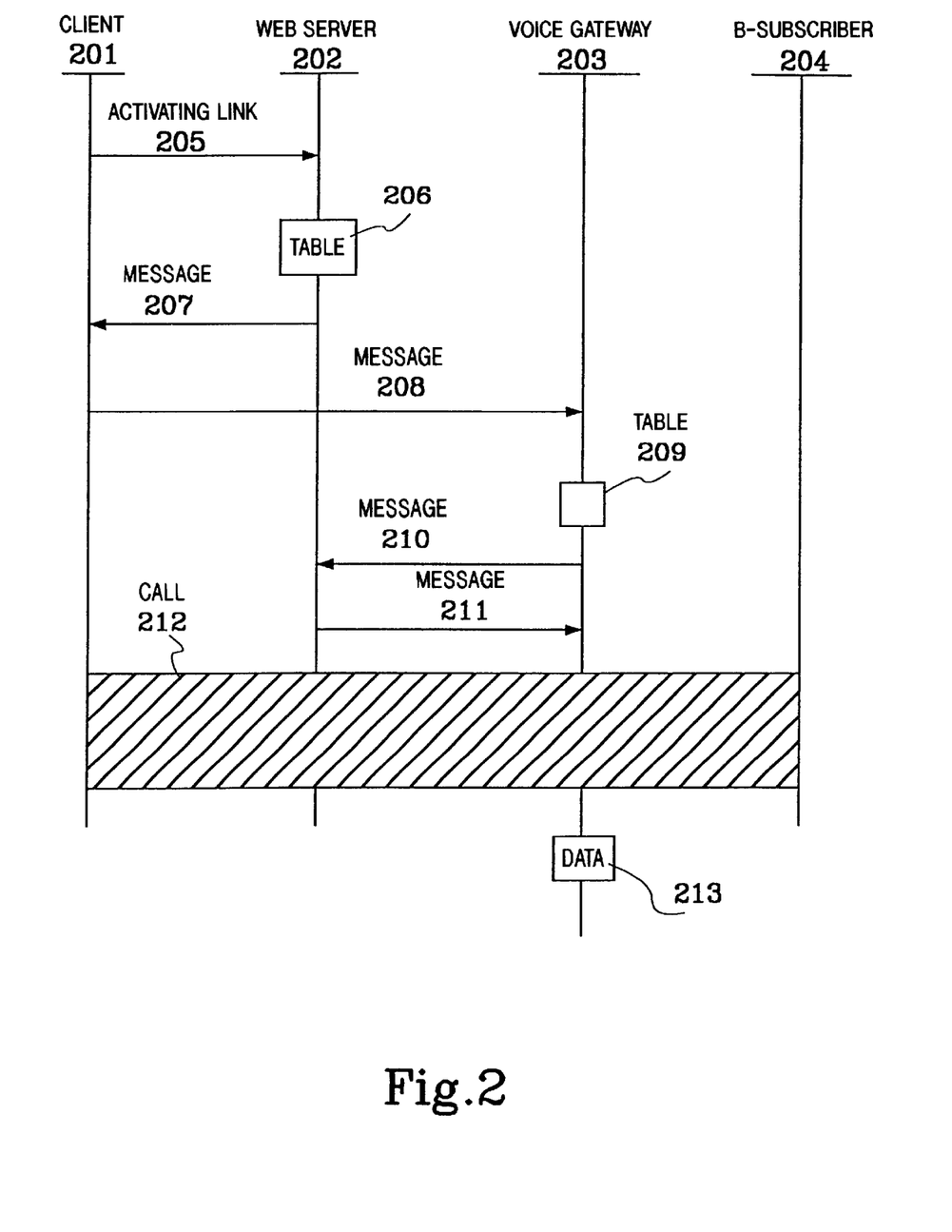
FIG. 2 illustrates a signalling scheme according to one embodiment of the invention.

In FIG. 2 is illustrated a schematic signalling scheme for above described embodiment according to the invention. The client is designated 201, the web-server 202, the voice gateway 203 and a B-subscriber 204, to which the telephone number is related. The activation of a link on a web-page of the web-server 202 by the client 201 is designated 205. Then the web-server stores the IP-address of the client 201, the IP-address of the voice gateway 203, a non-repetitive value and a time stamp in a table 206 and sends the IP-address of the web-server 202, the IP-address of the voice gateway 203, the non-repetitive value and the telephone number, to the client 201 in the message 207. The client 201 contacts the voice gateway 203 and requests a call to the B-subscriber and sends the IP-address of the web-server 202, the IP-address for the client 201, the non-repetitive value and the telephone number in the message 208. The voice gateway 203 confirms that the web-server 202 is an approved web-server by means of locating the IP-address of the web-server in a table 209.

Subsequently, the voice gateway sends a message 210 to the web-server 202 confirming that the client 210 is competent to perform requested telephone calls. In the message 210 the clients's IP-address, the IP-address of the voice gateway 203 and the non-repetitive value are transferred. The web-server answers with a message 211 depending on whether the verification was successful or not. The web-server searches for the transferred IP-address in the table 206 and controls that the transferred data correspond to the stored data. In the present embodiment the verification was successful, so message 211 contains a positive answer. Thereby, the voice gateway sets up a call 212 between the B-subscriber 204 and the client 201. The voice gateway logs relevant data 213, for instance the length of the call, the IP-address of the web-server 202, the IP-address of the client 201 etc for the operator of the voice gateway service to be able to debit the Internet provider for the client's use of the voice gateway service.

Figure 3:
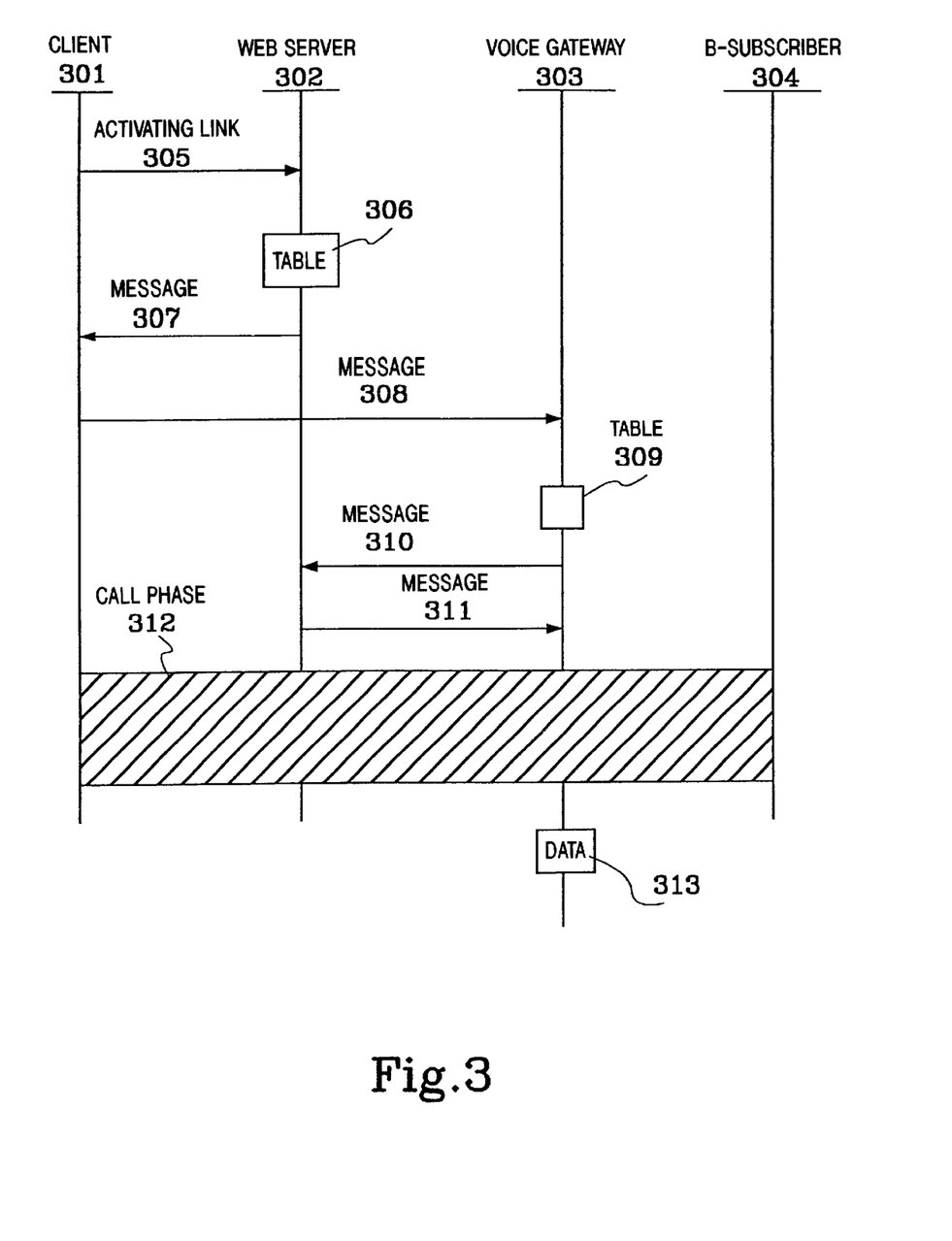
FIG. 3 illustrates a signalling scheme according to yet another embodiment of the invention.

In FIG. 3 is illustrated another embodiment according to the invention. This embodiment corresponds to the previous embodiment to all the way to message 310. That is the reference numerals 301 to 309 in FIG. 3 correspond exactly to the reference numerals 201 to 209 in FIG. 2. No further explanation is therefore given for these reference numerals. In the message 310 the voice gateway 303 only sends the IP-address of the client 301. The web-server 302 responds by sending the IP-address of the voice gateway 303, the non-repetitive value and the time stamp in the message 311. Thereafter, the voice gateway 303 can self determine whether or not the client is approved or not. If the client 301 is approved the call phase 312 is started and the voice gateway 303 logs relevant data 313.

Figure 4:
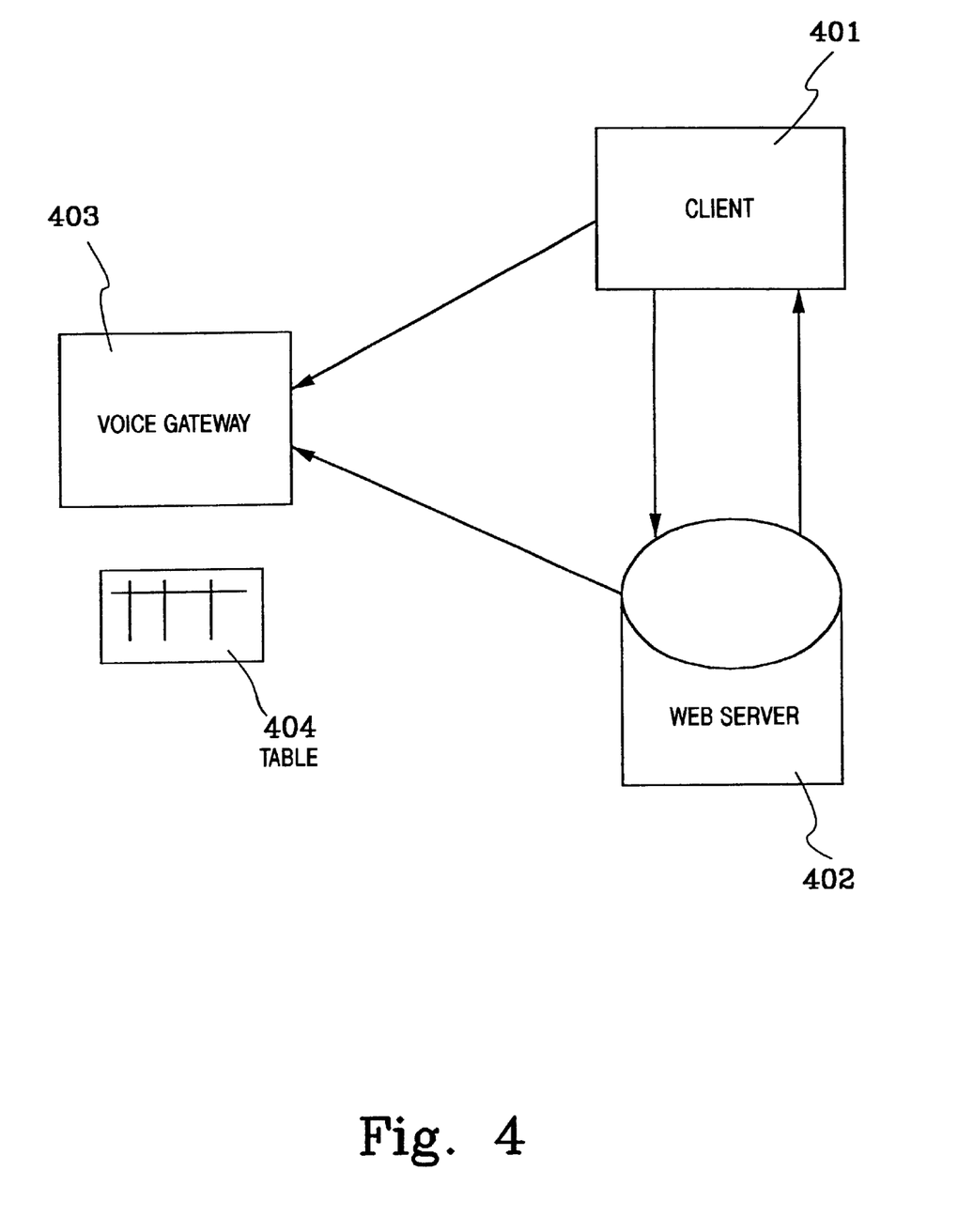
FIG. 4 illustrates a net model according to yet another embodiment of the invention.

In FIG. 4 there is shown yet another embodiment of the invention. A client is designated 401. In the same way as in the first embodiment, the client is a software, which is in a computer of a user. The client 401 can comprise a combination of a net-browser, such as Netscape Communicator, Mosaic or Microsoft Internet Explorer and a plug-in, "applet" or a help application supporting Internet-telephony. The client can support for instance H.323.

The client contacts a web-server 402 by means of the user clicking on an advertisement on a web-page. The web-server contacts a voice gateway 403 and transfers in a secure way the IP-address of the client, a telephone number and a time stamp. The time stamp comprises a value of when the client 401 contacted the web-server 402. That data is transferred in a secure way is guaranteed by a number of different functions which will not be described in more detail herein, but are well-known in the prior art. An example is the https protocol. The voice gateway 403 stores the received data in a table 404.

Thereafter, the web-server 402 answers on the client's activation of the link by means of sending to the client 401 the IP-address of the voice gateway 403 and the telephone number. Then, the client 401 contacts the voice gateway 403 and transmits the telephone number. The voice gateway can then decide if the client 401 is approved by comparing the IP-address of the client 401 to the value stored in table 404 and the time stamp. Thereby a verification is obtained by the client 401. Then, the voice gateway 403 logs data about the performed call. These data can comprise the length of the call, the telephone number, the IP-address of the web-server, the IP-address of the client etc.

Figure 5:
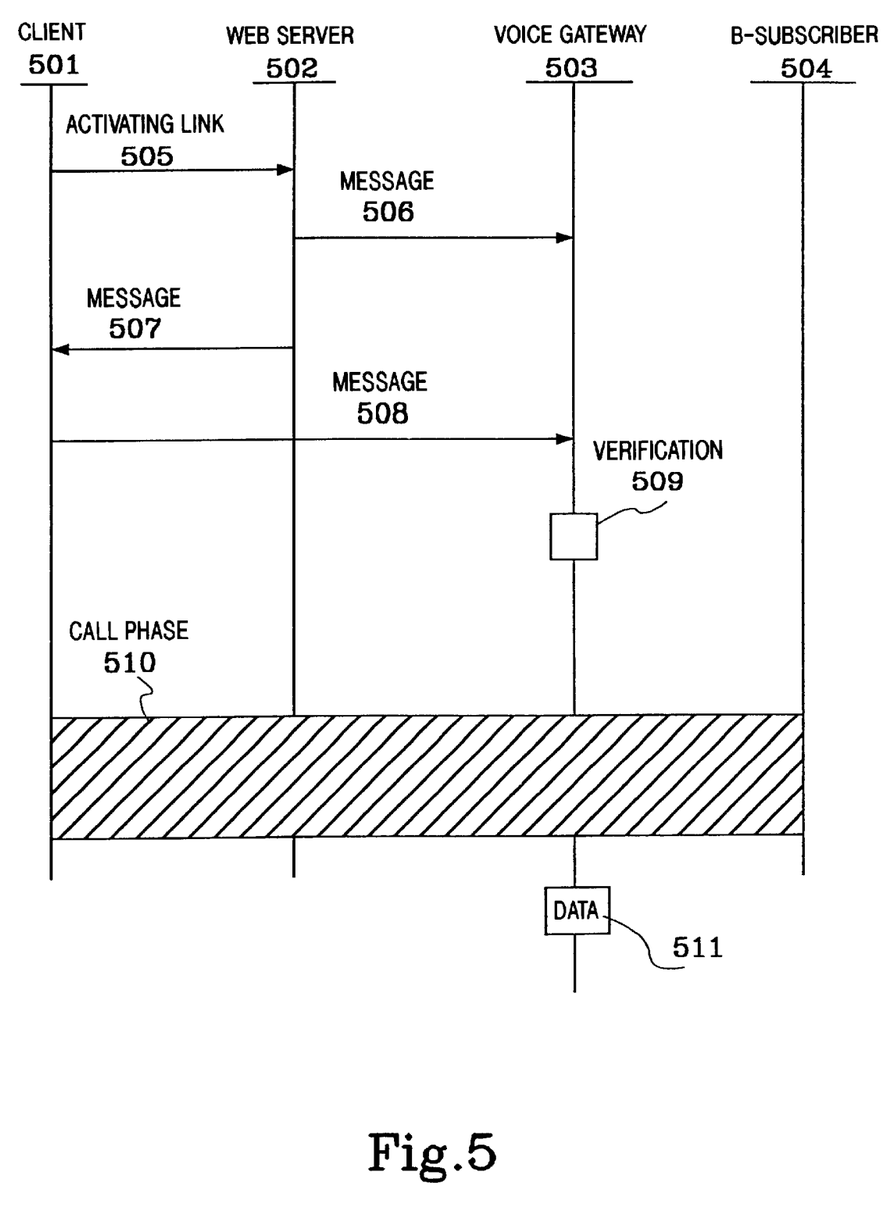
FIG. 5 illustrates a signalling scheme according to yet another embodiment of the invention.

In FIG. 5 is shown schematically a signal diagram according to the embodiment of the invention as above. A client is designated 501, a web-server is designated 502, a voice gateway is designated 503 and a B-subscriber is designated 504. The step that a user activates a link on a web-page of the web-server 502 is designated 505. Then the web-server 502 transfers the IP-address of the client 501, the telephone number to the B-subscriber and a time stamp to the voice gate way 503 in the message 506. Thereafter the IP-address of the voice gateway 503 and the telephone number in a message designated 507 are transferred from the web-server 502 to the client 501. The client 501 contacts the voice gateway 503 and transfers the telephone number to the B-subscriber in a message 508. The voice gateway 503 verifies that the client is competent by means of fetching the IP-address of the calling client 501 from the IP-stack. If the fetched IP-address corresponds to the previous, from the web-server 502 transferred IP-address, it is also controlled if the time stamp is fresh, i.e. that it is not too long since the client, 501 contacted the web-server 503.

If the verification 509 is successful a call is set-up between the client 501 and the call centre 504 over the voice gateway 503. The voice gateway logs data 511 about the call, including the call time, the telephone number, the IP-address of the web-server 502, the IP-address of the client 501 etc. Thereby a link is obtained between the web-server and the cost of the call and the operator of the web-server can be debited in a conventional way for the use of the voice gateway service.

Figure 6:
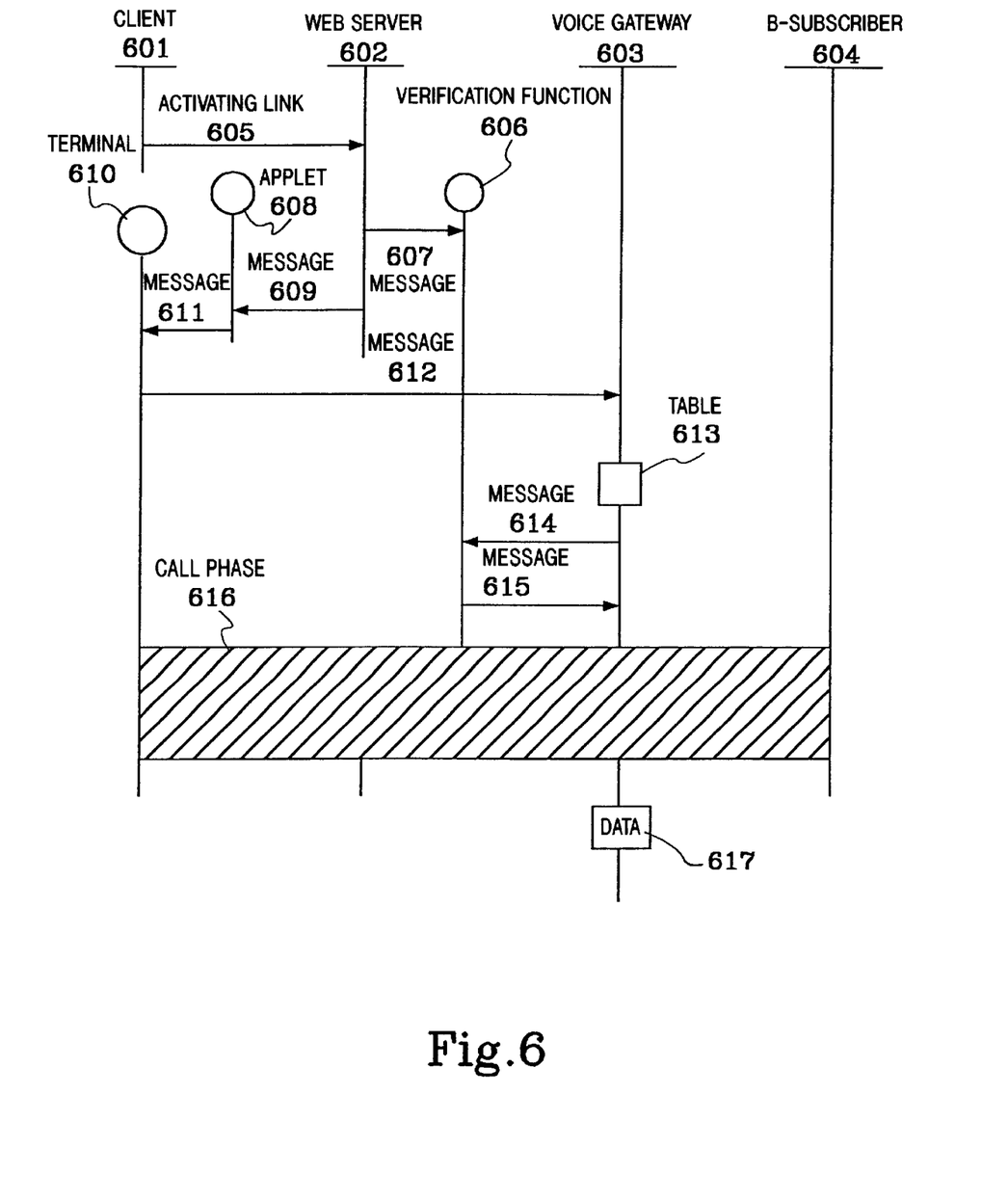
FIG. 6 illustrates yet another signalling scheme according to another embodiment of the invention.

In FIG. 6 there is shown yet another embodiment of the invention. A client is designated 601, a web-server is designated 602, a voice gateway is designated 603 and a B-subscriber is designated 604. The client 601 activating a link on a web-page on the web-server is designated 605. The activated link comprises a telephone number to the B-subscriber 604. The web-server 602 transfers a first set of data comprising for instance the IP-address of the client 601, the IP-address of the voice gateway 603, a non-repetitive value and a time stamp to a verification function 606 in the message 607. The verification function stores the first set of data in a table with the IP-address of the client 601 as key. The verification function can be executed by the same computer as the web-server 602, or in an own computer. The web-server 602 further transfers a second set of data, comprising for instance the IP-address of the web-server 602, the IP-address of the voice gateway 603, the non-repetitive value and the telephone number to the B-subscriber 604, to an "applet" 608 in a message 609. The "applet" 608 acts as a help function to the client 601. For instance Netscape Communicator and Internet Explorer support different types of "applets" in their net-browsers to be able to support extended functionality. The "applet" 608 activates an H.323 terminal 610 and transfers the second set of data to the terminal 610 in the message 611. The H.323 terminal 610 contacts the voice gateway 603 which also supports H.323 and transfers the second set of data to the voice gateway 603 in a message 612. The voice gateway 603 determines whether the web-server 602 is approved by searching for its IP-address in a table stored in the voice gateway 603. The voice gateway 603 further contacts the verification function 606 to verify the terminal 610 by a message 614 and receives a confirmation with a message 615 if the verification was successful. If the verification was successful a call is set-up between the terminal 610 and the B-subscriber 604 over the voice gateway 603. The call is logged 617 in the same way as is described above, so that charging can be performed.

Figure 7:
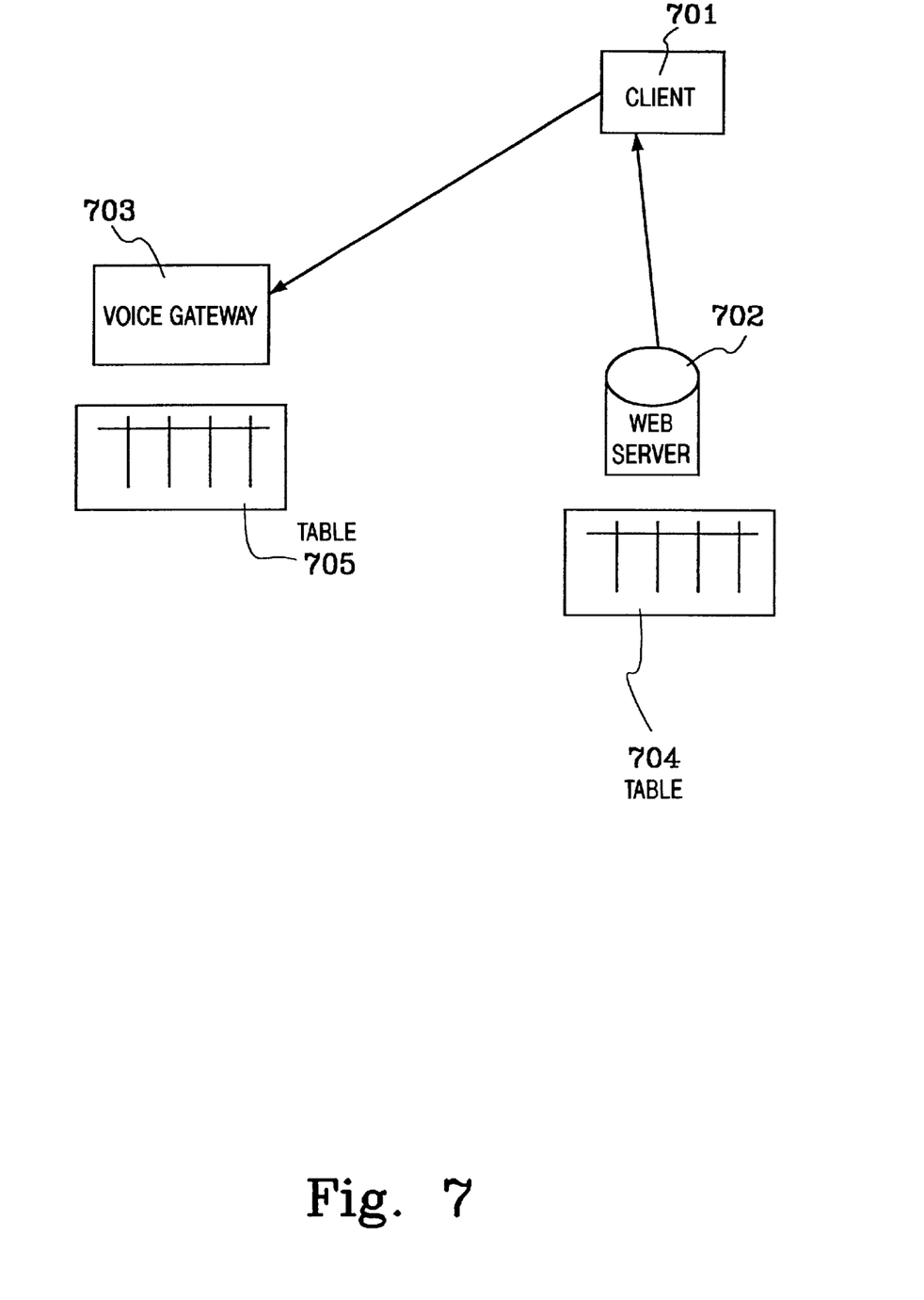
FIG. 7 illustrates a net model according to yet another embodiment of the invention.

In FIG. 7 is shown yet another embodiment according to the invention. A client is designated 701. In the same way as in the other embodiments, the client is a software which is in a computer of a user. The client 701 can comprise a combination of a net-browser, such as Netscape Communicator, Mosaic or Microsoft Internet Explorer and a plug-in "applet" or a help function supporting Internet telephony. The client can support for instance H.323.

The client contacts a web-server 702 by means of the user clicking on an advertisement on a web-page stored on said web-server 702. The web-server uses a time stamp, the client's IP-number, unique for a voice gateway 703 which is intended to be used for the call, and a private encrypting key, unique to the web-server 702 to encrypt said data, and resends the output data from the encryption key function to the client 701. The time stamp comprises a value of when the client 701 contacted the web-server 402. The public encryption keys to different voice gateways are stored in a table 704 in the web-server 702. Together with the encrypted data the IP-address of the voice gateway 703 is sent to the client 701.

The client 703 contacts the voice gateway 703 and sends the encrypted data, the telephone number to the B-subscriber and the IP-address of the web-server 702. The voice gateway searches for the IP-address of the web-server 702 in a table 705 and obtains the web-server's public encryption key. Thereby the voice gateway can decrypt the message and obtain the client's IP address, which is verified to the called client's IP-address and a time stamp. If the time stamp is not too old the call is set-up in a similar way as described in the other embodiments.

Encryption using public and private encrypting keys is well-known and is not described in more detail herein. Also other types of encrypting techniques is possible to solve the encryption above and above description is not limiting the encrypting function to encryption by public and private keys.

The invention is of course not limited to the above-described embodiments illustrated in the drawings, but can also be modified within the scope of the appended claims.

What is claimed is:

1. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

transferring a first set of data from the web-server to the voice gateway, the first set of data comprising an IP-address for the client, the telephone number, and a time stamp;

storing the first set of data at the voice gateway;

transferring an IP-address of the voice gateway from the web-server to the client;

transferring the telephone number from the web-server to the client;

transferring the telephone number from the client to the voice gateway via the IP-address of the voice gateway;

verifying, in the voice gateway, that the client is authorized to use the voice gateway to make a call, based on the stored first set of data and an IP-address of the calling, client fetched by the voice gateway from an IP-stack, wherein the verification is considered to have failed a) if the client contacts the voice gateway later than a time that is determined by the time stamp plus a constant, or b) if the stored IP-address of the client does not correspond to the IP-address of the client that is fetched from the IP-stack, or c) if the stored telephone number does not correspond to the one transferred from the client; and setting up the call, when the step of verifying indicates that the client is authorized to use the voice gateway, between the B-subscriber and the client over the voice gateway.

2. The method according to claim 1 wherein charging data about the call is stored by the voice gateway as a basis for charging.

3. The method according to claim 2 wherein the charging data comprises the IP-address of the client, an IP-address of the web-server, a starting time of the call, a stopping time of the call and the IP-address of the voice gateway.

4. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

transferring a first set of data from the web-server to the client, the first set of data comprising an address of the voice gateway, the address of the web-server, a non-repetitive value and the telephone number;

storing a second set of data in a first table in the web-server, the second set of data comprising an address of the client, the address of the voice gateway, the non-repetitive value and a time stamp;

transferring a third set of data from the client to the voice gateway via the address of the voice gateway, the third set of data comprising the address of the web-server, the address of the client, a non-repetitive value and the telephone number;

if an address of the web-server is stored in a second table, contacting the web-server by the voice gateway for verification of the client, and transferring a fourth set of data from the voice gateway to the web-server, the fourth set of data comprising the address of the voice gateway, the address of the client from the third set of data, and the non-repetitive value from the third set of data;

verifying, via a verification function applied to the fourth set of data and the second set of data, that the client is authorized to use the voice gateway to place the call; and setting up the call, when the step of verifying indicates that the client is authorized to use the voice gateway, between the B-subscriber and the client over the voice gateway.

5. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

transferring a first set of data from the web-server to the client, the first set of data comprising an address of the voice gateway, the address of the web-server, a non-repetitive value and the telephone number;

storing a second set of data in a first table in the web-server, the second set of data comprising an address of the client, the address of the voice gateway, the non-repetitive value and a time stamp;

transferring a third set of data from the client to the voice gateway via the address of the voice gateway, the third set of data comprising the address of the web-server, the address of the client, a non-repetitive value and the telephone number;

contacting the web-server by the voice gateway for verification of the client, and transferring a fourth set of data from the voice gateway to the web-server, the fourth set of data comprising the address of the voice gateway, the address of the client from the third set of data, and the non-repetitive value from the third set of data;

verifying, via a verification function applied to the fourth set of data and the second set of data, that the client is authorized to use the voice gateway to place the call;

transferring a message from the web-server to the voice gateway indicating a result of the verification; and setting up the call, when the step of verifying indicates that the client is authorized to use the voice gateway, between the B-subscriber and the client over the voice gateway.

6. The method according to claim 5 wherein if the voice gateway contacts the web-server later than a time of the time stamp plus a constant, or if the non-repetitive value in the third set of data does not correspond to the non-repetitive value in the second set of data, the verification is considered to have failed.

7. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

transferring a first set of data from the web-server to the client, the first set of data comprising an address of the voice gateway, the address of the web-server, a non-repetitive value and the telephone number;

storing a second set of data in a first table in the web-server, the second set of data comprising an address of the client, the address of the voice gateway, the non-repetitive value and a time stamp;

transferring a third set of data from the client to the voice gateway via the address of the voice gateway, the third set of data comprising the address of the web-server, the address of the client, a non-repetitive value and the telephone number;

contacting the web-server by the voice gateway for verification of the client;

in response to the step of contacting the web-server by the voice gateway, transferring the second set of data stored in the first table, from the web-server to the voice gateway;

verifying, via the voice gateway, the client based on the second and third sets of data transferred from the web-server to the voice gateway;

wherein if the voice gateway contacts the web-server later than a time which is determined by means of the time stamp plus a constant, or if the non-repetitive value in the third set of data does not correspond to the non-repetitive value in the second set of data, the verification is considered to have failed; and setting up the call, when the step of verifying indicates that the client is authorized to use the voice gateway, between the B-subscriber and the client over the voice gateway.

8. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

transferring a first set of data from the web-server to a verification function, the first set of data comprising an IP-address of the client, an IP-address of the voice gateway, an IP address of the web-server, a non-repetitive value and a time stamp;

storing the transferred first set of data by the verification function;

transferring a second set of data from the web-server to an "applet", the second set of data comprising the IP-address of the client, the IP-address of the voice gateway, the non-repetitive value and the telephone number to the B-subscriber;

activating, via the "applet", an H.323 terminal;

transferring the second set of data from the "applet" to the H.323 terminal;

transferring the second set of data from the H.323 terminal to the voice gateway;

contacting, via the voice gateway, the verification function;

verifying, via the verification function based on the first and second sets of data, the client;

informing the voice gateway of a result of the verification; and setting up the call between the B-subscriber and the client over the voice gateway, when the step of verifying indicates that the client is authorized to use the voice gateway.

9. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

verifying, via a verification function, that the client is authorized to use the voice gateway to place the call, wherein the step of verifying comprises the substeps of encrypting, via the web-server, a first set of data, the first set of data comprising an address of the client and a time stamp;

transferring a second set of data from the web-server to the client, the second set of data comprising the encrypted first set of data, an address of the voice gateway, and the telephone number;

transferring a third set of data from the client to the voice gateway via the address of the voice gateway, the third set comprising the encrypted first set of data, an address of the web-server, and the telephone number;

decrypting in the voice gateway the first set of data; and verifying the client based on the first set of data; and setting up the call, when the step of verifying indicates that the client is authorized to use the voice gateway, between the B-subscriber and the client over the voice gateway.

10. The method according to claim 9 wherein if the voice gateway contacts the web-server later than a particular time, which is determined by the time stamp plus a constant, or if a non-repetitive value in the third set of data does not correspond to a non-repetitive value in the second set of data, the verification is considered to have failed.

11. A method for placing a voice call from a client on an internet to a B-subscriber in a telephone system, wherein the call is established through the internet and the telephone system via a voice gateway which is provided by a provider of voice gateway services between the internet and the telephone system, the method comprising the steps of:

activating, by the client, a link on a web-page of a web-server in the internet, wherein a telephone number to the B-subscriber is on the web-page and is associated with the link;

verifying, via a verification function, that the client is authorized to use the voice gateway to place the call, wherein the step of verifying comprises the substeps of encrypting, via the web-server, a first set of data;

transferring a second set of data, comprising the first, encrypted set of data from the web-server to the client;

transferring a third set of data, comprising the encrypted set of data from the client to the voice gateway;

decrypting in the voice gateway the first set of data; and verifying the client based on the first set of data; and setting up the call, when the step of verifying indicates that the client is authorized to use the voice gateway, between the B-subscriber and the client over the voice gateway;

wherein a) the web-server comprises a table, in which each post comprises an IP-address to, and a public encryption key for, a voice gateway, and b) the web-server encrypts the first set of data by means of using the public encryption key for a selected voice gateway and a private encryption key; and wherein a) the voice gateway comprises a table in which each post comprise an IP-address to, and a public encryption key for, a web-server, and server, and b)the voice gateway encrypts the first set of data by means of using the public encryption key for a particular web-server and a private encryption key.

* * * * *